United States Patent
Brown

(10) Patent No.: US 9,959,508 B2
(45) Date of Patent: May 1, 2018

(54) SYSTEMS AND METHODS FOR PROVIDING INFORMATION FOR PREDICTING DESIRED INFORMATION AND TAKING ACTIONS RELATED TO USER NEEDS IN A MOBILE DEVICE

(71) Applicant: CloudMade, Inc., Menlo Park, CA (US)

(72) Inventor: James Brown, Flitton (GB)

(73) Assignee: CloudMade, Inc., Sunnyvale, CA (US)

( * ) Notice: Subject to any disclaimer, the term of this patent is extended or adjusted under 35 U.S.C. 154(b) by 398 days.

(21) Appl. No.: 14/664,350

(22) Filed: Mar. 20, 2015

(65) Prior Publication Data

US 2015/0294223 A1    Oct. 15, 2015

Related U.S. Application Data

(60) Provisional application No. 61/968,043, filed on Mar. 20, 2014.

(51) Int. Cl.
    *G06N 99/00*    (2010.01)
(52) U.S. Cl.
    CPC ................................. *G06N 99/005* (2013.01)
(58) Field of Classification Search
    None
    See application file for complete search history.

(56) References Cited

U.S. PATENT DOCUMENTS

| | | |
|---|---|---|
| 2003/0182033 A1 | 9/2003 | Underdahl et al. |
| 2004/0219982 A1 | 11/2004 | Khoo et al. |
| 2005/0075119 A1 | 4/2005 | Sheha et al. |
| 2005/0102098 A1 | 5/2005 | Montealegre et al. |
| 2006/0107219 A1 | 5/2006 | Ahya et al. |
| 2006/0229780 A1 | 10/2006 | Underdahl et al. |
| 2007/0150174 A1 | 6/2007 | Seymour et al. |
| 2010/0088020 A1 | 4/2010 | Sano et al. |
| 2010/0191728 A1* | 7/2010 | Reilly ............... G06F 17/30265 707/736 |
| 2011/0307478 A1* | 12/2011 | Pinckney ............. G06N 99/005 707/724 |
| 2012/0009890 A1 | 1/2012 | Curcio et al. |
| 2012/0089893 A1* | 4/2012 | Bousamra .......... A61B 5/14532 714/807 |

(Continued)

FOREIGN PATENT DOCUMENTS

WO    WO-2014018687 A1 *    1/2014    ......... G06F 17/2785

*Primary Examiner* — Alan S Chen
(74) *Attorney, Agent, or Firm* — KPPB LLP

(57) ABSTRACT

Systems and methods for providing inferences for use in prediction algorithms to mobile devices are disclosed. The mobile device detects an event and generates an event record that includes contextual information for the event. The event record is transmitted from the mobile device to a service provider system. The service provider system stores the event record on a cloud storage system. The cloud storage system uses the stored event records to generate inferences. The inferences are then passed to the service provider system. In turn, the service provider system provides the inferences to the proper mobile devices. The mobile devices then use the inference in prediction algorithms to generate prediction information that is used to configure applications provided by the device to operate in accordance with a predicted event.

15 Claims, 11 Drawing Sheets

(56) References Cited

U.S. PATENT DOCUMENTS

| | | | | |
|---|---|---|---|---|
| 2014/0171039 A1* | 6/2014 | Bjontegard | ....... | H04L 29/06034 |
| | | | | 455/414.1 |
| 2014/0257989 A1* | 9/2014 | Prakah-Asante | .. | G01C 21/3484 |
| | | | | 705/14.63 |
| 2014/0357312 A1* | 12/2014 | Davis | .................... | G06F 3/0481 |
| | | | | 455/550.1 |

* cited by examiner

SYSTEMS AND METHODS FOR PROVIDING INFORMATION FOR PREDICTING DESIRED INFORMATION AND TAKING ACTIONS RELATED TO USER NEEDS IN A MOBILE DEVICE

CROSS REFERENCE

This application claims priority to U.S. Provisional Patent Application No. 61/968,043 "Systems and Methods for Providing Information for Predicting Desired Information in a Mobile Device" filed Mar. 20, 2014 which is hereby incorporated by reference as if set forth herewith.

FIELD OF THE INVENTION

This invention relates generally to mobile devices and more specifically to systems and methods for providing information to allow a mobile device to predict desired information to display for a user.

BACKGROUND OF THE INVENTION

As people are increasingly using mobile phones, navigation devices, tablets, connected cars and other computing devices, there is a need for these systems to understand the user's needs/preferences and dynamically adapt to these needs/preferences. Typically, the device can assess these needs based upon the inputs from the user. For example, a device will show multiple routes between a point of origin and a destination based on an input of the point of origin and destination by the user. The user may select a route to use and input the selected route into the device. The device may then display the route and any points of interest along the route that may be relevant to the user such as gas station and the prices of fuel at these stations. However, the fact that the user has to take action to express his/her needs/preferences makes the ability of the device to predict the user's needs limited to the inputted expressions. To be useful, the device needs to be able to predict the user's needs and/or preferences at any time based not only on the user interaction, but also on the context of the environment of the device. For example, the where location of the user and/or device, the weather at the location, the destination of the user, and vehicle conditions (such as the amount of fuel remaining in a gas tank) may affect a user's future action.

It is known that a user is often a creature of habit and generally performs the same task on the same day at about the same time (given the same context—such as weather, traffic, etc.). Thus, information about the user's use of the device in the past can be used to predict the needs of the user in the future in a similar context. In the past, there were not any available methods for a device to study the use of the device by user as to do so would require that the device store all of the information about the user's past interactions and have sufficient computational capability to process this information.

Cloud computing now provides a system that can store massive amount of data and connect it with massive/scalable compute capacity. As such, a cloud storage and processing system may be used to store and process information about the interaction between a user and a device. To do so, the device uploads information about the interaction to the cloud storage system that then stores a record of the interaction with other records of interactions. This provides a great resource of data for use in studying the interactions between the user and the device.

SUMMARY OF THE INVENTION

The above and other problems are solved and an advance in the art is made by systems and methods for providing information for predicting desired information and taking actions related to user needs in a mobile device in accordance with embodiments of this invention. In accordance with some embodiments of the invention, a mobile device includes memory and a processor. Instructions stored in the memory direct the process to perform in the following manner. An event in the device is detected. An event may be an interaction with the device. Contextual information for the event is obtained. Contextual information is current information available to the device. An event record is generated that includes an identifier of the event and the contextual information. The event record is transmitted to a service provider system. In response to the transmission of the event record, an inference is received from the service provider system. The inference is generated from the event records for the device stored in a cloud storage system by the service provider. The inference is then applied to a prediction engine to generate prediction information. The prediction information is provided to an application performed by the device wherein the application uses the prediction information to configure the application to operate in accordance with the prediction information.

DETAILED DISCLOSURE OF THE INVENTION

Figure 1:
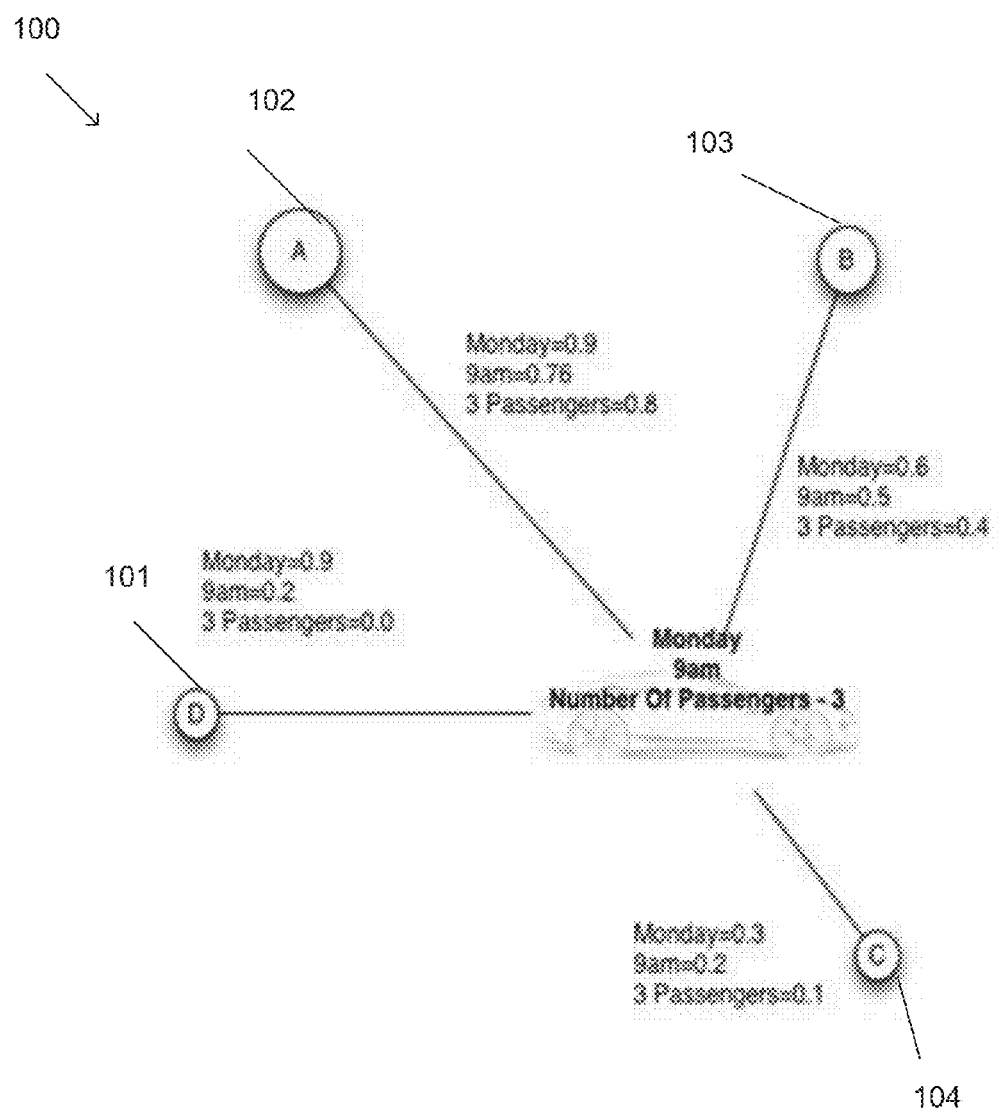
FIG. 1 illustrates a graphical representation of the probabilities of different destinations from a particular origin in accordance with an embodiment of this invention.

Turning now to the drawings, embodiments of systems and methods for providing information to predict information relevant to a user of a mobile device are illustrated. In accordance with embodiments of this invention, a mobile device records events. For purposes of this discussion, an event is an interaction with the mobile device. Interactions may include inputs received from the user, a sensor connected to the mobile device, or information received from a service provider via a network connection. Examples of user interaction in accordance with embodiments where the device is an infotainment device in a vehicle include, but are not limited to, display window changes on the device, search element selection, and cabin temperature selections. Examples of sensor interactions in accordance with embodiments where the device is an infotainment device in a vehicle include, but are not limited to, detection of an engine start/stop, detection of door conditions (closed/ajar), tire pressure, fuel levels, tire slip distortion, wiper activity, lidar input, camera input, acceleration, breaking, and suspension input, environmental temperature, barometric pressure, ambient light, and cloud cover. Examples of information received via network interaction in accordance with embodiments where the device is an infotainment device in a vehicle include, but are not limited to, Global Position System (GPS) coordinates and time coordinates.

When an event is recorded, the device obtains contextual information for the event. Contextual information is information about the current conditions of the event. Examples of contextual information in embodiments where the device is an infotainment system in a vehicle, include, but are not limited to, the identity of the user of the device, date (including date of the month and/or date of the week), time of day, and sensor data (including number of passengers, engine conditions, and the like). An event summary record including an identifier of the recorded event and the contextual information is then generated and transmitted to a cloud storage system.

The cloud storage system stores the event summary record in a cluster on a cloud storage system. A secondary contextual repository is also stored on the cloud storage system. The secondary contextual repository is a cluster of records about secondary contextual information. Secondary contextual information is information about the environment at the time of an event. Examples of secondary contextual information includes, but is not limited to, weather conditions, road/traffic conditions, occurrences of special events, points of interest on road networks and other like data.

The cloud storage system includes specific inference generation modules. Each specific inference generation module generates inferences and/or activity patterns for users based upon the stored event summary records and the contextual information records.

The cloud storage system may use the generated inferences for analytical reporting and for the extraction of map features and attributes to build map data. The inferences relevant to a particular device are then determined by the service provider system and provided to the devices. The inferences relevant to a particular device may include device specific inferences and/or user specific inferences.

The device receives the inferences particular to the device from the cloud storage system and stores the inferences in a database. The device also obtains contextual information. Contextual information may be obtained from sensors connected to the device and/or information received from a provider system via the network connection in accordance with some embodiments of this invention. The device can then use the stored inferences and the contextual information to predict a future event based upon these conditions. In accordance with some embodiments, the device uses the prediction of an event to configure applications provided by the device to operate in a manner consistent with the predicted event. For example, a User Interface (UI) of the device may display desired data based upon the prediction(s) in accordance with some embodiments. In accordance with many embodiments, the devices rank information based upon the predictions and displays a choice of the data to display based upon the rankings of the information based upon the predictions.

In accordance with some embodiments of this invention, the device is an infotainment system in a vehicle. In accordance with many embodiments, the prediction is for driver and/or vehicle information to display on the device. The predictions can be generated from analysis of GPS tracks collected from the device on an individual vehicle. A general approach is to extract trip events and stop events from the event summaries collected by the device. A trip event represents movement across space from an origin to a destination. A stop event represents the individual leaving the vehicle to perform an activity. In accordance with some embodiments, the number of passengers in a vehicle may be sensed and a stop event may include one or more of the passengers disembarking from the vehicle. The analysis of the trips is used to build up a model of relations between places and/or events, what time an event occurs, and/or the frequency an event takes place to show a specific context that influences the probability that an event is about to occur. The analysis of stop events is used to create metrics relating to the length of time a user stays at a destination the regularity of the visits to the destination, the time(s) of day of the visits and the day(s) of the week of the visits.

In a number of embodiments, a clustering process is performed with respect to the event summary records and contextual records to relate multiple stop events for one particular destination. The grouping is needed as a vehicle may be parked at different physical locations for the same destination. For example, a particular destination may have two or more parking areas. Thus, parking in any of these areas is indistinguishable in terms of determining the destination and the inference algorithm can account for the difference. The density of locations of stop events in a particular area influences the aggressiveness of the clustering. In other words, as the density of the set of destinations in an area increases, the aggressiveness of the clustering of stop events decreases. The end result is a directed graph structure that can be used to analyze the relatedness between stop events. This inference can be used to produce a probabilistic prediction for a given user, location, time of day, and/or time of week. The meta data of the generated clusters is made available for future analysis.

In accordance with embodiments incorporated into an infotainment system for a vehicle, the inferences generated include three types: inferences about a user (a particular person), inferences about the vehicle (across a group of people), and inferences about the real world (across vehicles). The inferences about the drivers and the vehicles can be moved into an OLAP analytic system to support greater driver reporting as well as provided to the device. Inferences about the real world can be built into augmented map elements across users by the cloud storage system. These map elements may range from highly transitory conditions (such as, but not limited to, current traffic conditions and weather conditions) to semi-permanent conditions (such as, but not limited to, traffic hazards and speed limits).

The inferences generated are based upon the type of predictions being made and the manner in which the predictions are made. In accordance with a number of embodiments having an infotainment system for a vehicle, the predictions being made are the next destination, the next route to take, and the next maneuver to perform. Furthermore, the predictions are approached as a ranking problem. A prediction is calculated through a comparison of the current context to historically observed contexts that are most related to each destination, route, and/or maneuver. The degree of similarity between observed contextual information and the current contextual information can be used to measure the certainty and/or uncertainty of the prediction.

In accordance with many embodiments of this invention, inferences are used to make predictions. For purposes of this discussion, an inference is a data structure that includes data describing a set of alternative destinations, routes, and/or maneuvers for each vehicle and/or person and the observed contextual information for each alternative destination, route, and/or maneuver. The contextual information is information that can be used to characterize the situation that affects the behavior and/or action of an individual and/or vehicle. In accordance with a number of embodiments, the primary contextual information gathered and used to make predictions includes (but is not limited to): identity information, location information, time information, and environment information. Identity information includes, but is not limited to, the identity of the user, the identity of the vehicle, the type of vehicle, the number of passengers, fuel level of the vehicle. The location information includes, but is not limited to, GPS coordinates and a history of recent locations. Time information includes, but is not limited to, UTC time stamp information.

In accordance with some embodiments of this invention, secondary contextual information is derived during the inference generation process from the primary contextual information. This second contextual information includes, but is not limited to, the origin of a trip, a destination of a trip, places of interest, statistical on arrival time at a destination, statistics on departure times from an origin, frequency of visits to a destination for each day of the week, a ratio of the frequency of visits to a destination compared to all the destinations visited on a day of the week, time of the last place visited, origins linked to a particular destination including metrics defining the strength of the relationship between the locations, statistics of the first N GPS coordinate readings from each origin to a destination, speed of travel, direction of travel, curvature of travel, streets followed between an origin and destination, maneuvers extracted from matching trips and transition possibilities using a Markov approach.

In accordance with embodiments of this invention, each inference is both non-redundant and robust. A non-redundant inference only includes the context variables needed to form a prediction. A robust inference is an inference that does not mandate a complete set of context variables that may be used to form a prediction. The set of context variables may not be complete due to any number of factors including, but not limited to, gaps in the historical data due to no previous history of trips between an origin and a destination, unavailability of data about certain types of information from the vehicle, and/or unavailable of information from service providers.

In accordance with a number of embodiments incorporated in an infotainment device of a vehicle, the system is used to make predictions about the current destination, the route to a destination, and maneuvers taken along the route. The basic model of an inference in the embodiments is a set of alternative destinations, routes, and/or maneuvers. Each member of the set includes a list of attributes and probabilities and/or weights related to the values of each attribute in the list. The list of attributes is a list of relevant contextual information and metrics describing each piece of information. The metrics and weights will be used in a prediction algorithm to generate distances between the current context of the user and the historical observed contexts of destinations. For example, a destination is observed to be visited often on a Monday. Further, the destination is a destination in a high percentage of all trips observed on Mondays. The destination is assigned a metric and a weight to reflect the temporal context that Monday plays an important role in the determination of this destination based on a similar context. The assigned metrics and weights are derived from analytics that take place during the inference generation process. The difference between a current context and the historical context of the destination is used to determine the likelihood of the destination being currently visited.

In accordance with a number of embodiments incorporated into an infotainment system for a vehicle, inferences for destinations are formed on the following basis. The destination inferences are produced by building and analyzing a directed spatio-temporal graph of origins and destinations. A node in the graph is a single location and each location is connected by edges generated from observed trips. Each edge includes attributes describing the place, time, identity, and environmental contextual information for the trip. The target destination inference is output by the analytical processes that is a set of all the destinations visited by a user. Each destination will be represented a set of data taking a form of d(I,C,W), where I is a location, C is a set of contextual measures associated with the destination, and W is a set that includes a weight for each of the contextual measures.

The weights are derived for analysis of the contextual variables. For example, a user frequently travels from a particular origin to a particular destination. The vehicle of the user being at that particular origin is a strong indication that the user is travelling to the particular destination. Thus, the particular origin is assigned a greater weight for that particular destination. If a prediction of the destination is performed at the particular origin, the origin is heavily weighted for the destination.

In accordance with a number of embodiments, some contextual elements may be omitted as being redundant. For example, if the user travels from the particular origin to the particular destination in any type of weather, the context of a particular type of weather, such as sunny, is irrelevant and is not included as being redundant. Hence, the set of contextual measures C for a destination minimally includes, but is not limited to, a set of origins, and a set of statistics describing the temporal profile of the destination. One skilled in the art will recognize that more contextual elements may be included in the set, C, however, the origins and temporal information are the basis of the predictions and are easily ascertained from GPS location information. An example of a prediction approach that ranks possible destinations from a particular origin is shown in FIG. 1. Graph 100 shows destinations 101-104. Destinations 101-103 have approximately the same similarity distance from the origin based on the current context of the user. Thus, element 101-103 are combined using weights to generate a single value that is used to rank the destinations.

In accordance with some embodiments incorporated into an infotainment system of a vehicle, inferences for routes are formed on a similar basis as the inferences for a destination. The inferences for routes are used to predict streets that are traversed between an origin and a destination based on the current contextual information for the vehicle. The inference generating process analyzes the historical context of GPS data captured during previously recorded trips and overlays the GPS coordinates with a road network.

In accordance with many embodiments incorporated into an infotainment system of a vehicle, the inference model for routes is a set of topologically connected lines. Each line includes recorded contextual information for an associated portion of the route. Each section of the route line includes a reference to at least one destination. The prediction made by using route inferences are a set of connected polylines. Each of the polylines in the set has a probability value that the line will be visited.

In accordance with a number of embodiments incorporated into an infotainment system of a vehicle, the destination of the user/vehicle is an important contextual fact in determining the route taken. The likelihood metric of a particular destination for a particular route can have a strong relationship to the probability of the route being selected. Thus, if two or more destinations have routes that at least partially overlap, the probabilities of the overlapping sections would be combined to produce a higher probability that the section will be used.

Figure 2:
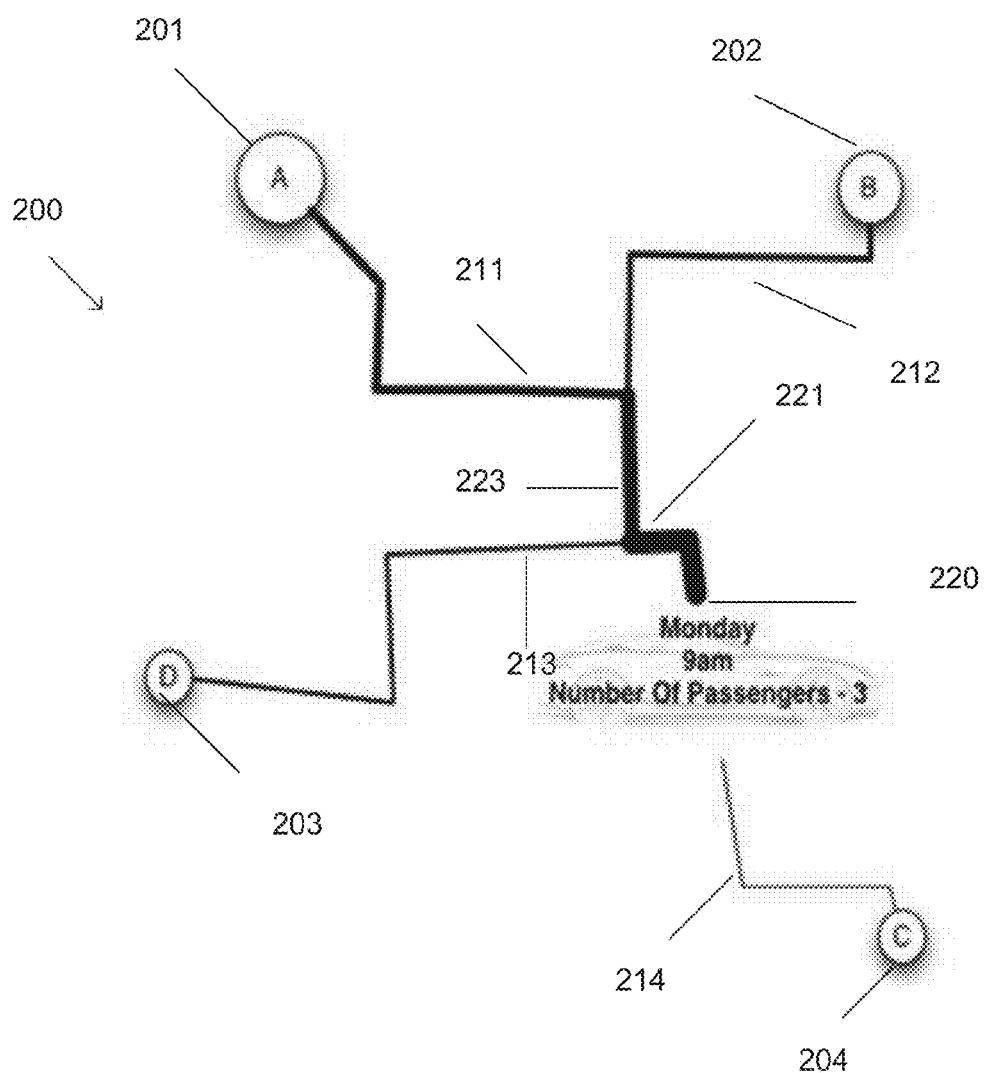
FIG. 2 illustrates a graphical representation of the probability of different routes that may be taken from a particular origin in accordance with embodiments of this invention.

An example of a topographical map of inferences for routes in accordance with an embodiment of the invention is shown in FIG. 2. On topographical map 200, destinations 201-204 are possible destinations from origin 205. Each destination 201-204 has a corresponding route 211-214 that connects the destination 201-204 to the origin 205. The routes 211-213 of destinations 201-203 share common sections 220 and 221. Furthermore, the routes 211 and 212 of destinations 201 and 202 share common section 223. Thus, an inference built for origin 205 has a higher probability of sections 220 and 221 being selected as these sections lead to three routes. Likewise, section 223 is heavily weighted because it is a likely selection when the vehicle is at the end of section 221 since it is connected to two destinations.

In accordance with embodiments of the invention incorporated into an infotainment system of a vehicle, an inference for a maneuver is formed on the following basis. A list of maneuvers for each route is extracted for the event records. The context of each maneuver in the route is derived using a Markov analytical approach to determine transitional probabilities between two edges in a route network graph and the contextual elements that influence the transition from one edge to another. The resulting model for an inference of a maneuver is a set of edges. Each edge includes the next maneuver observed for the present maneuver and the context for the next maneuvers. Each maneuver is also associated with one or more destinations to which the maneuver leads. The maneuvers are provided as feedback to the destination inferences in accordance with some embodiments to update the destination prediction as the trip progresses. The feedback allows the device to learn from the recent history and improve the prediction process.

Figure 3:
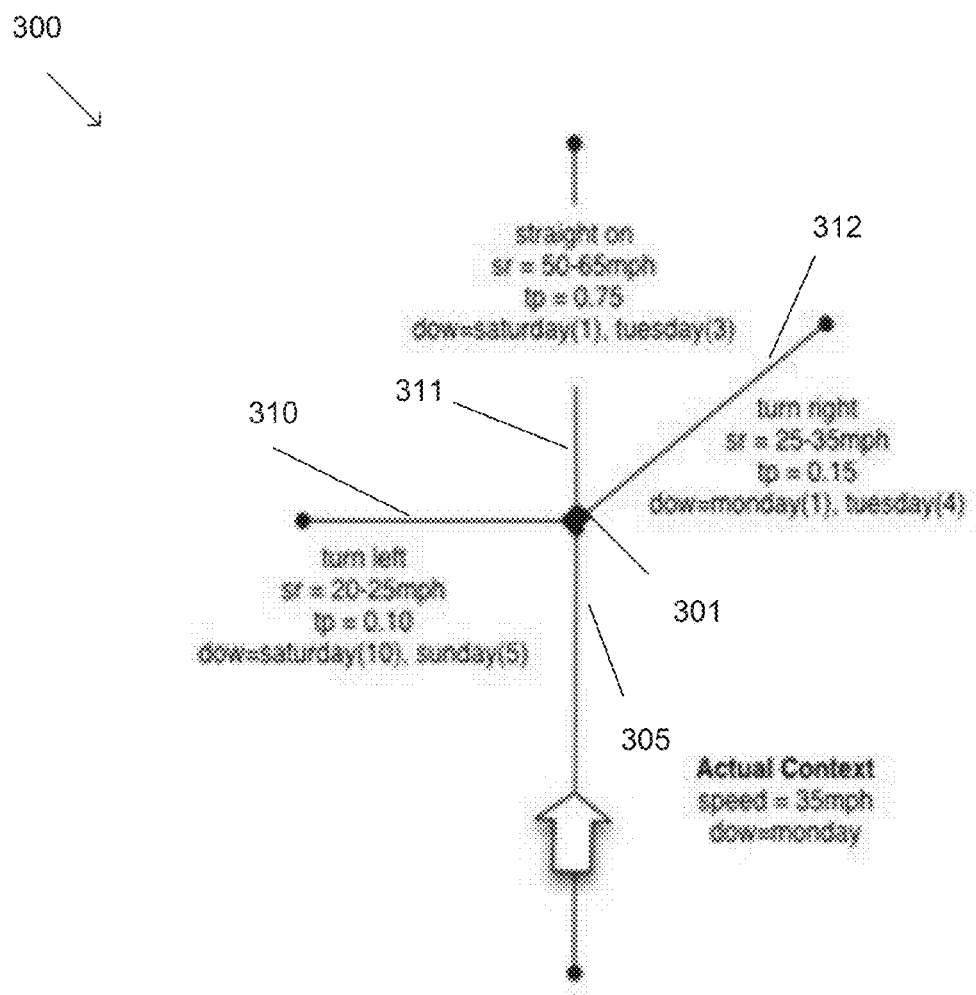
FIG. 3 illustrates a graphical representation of the probability of different maneuvers based upon a current location in accordance with an embodiment of this invention.

A graphical model of the inferences for a maneuver in accordance with an embodiment of this invention is shown in FIG. 3. The observed context of the trip is represented for maneuver 301 is shown by edge 305. The edge 305 shows that the current vehicle speed is 35 miles per hour and the day of the week is Monday. Edges 310-312 each represent an inference for maneuver 301 and include contextual information for the particular maneuver. The edge 310 shows that a left hand turn is performed when the speed range is between 20-25 mile per hour, the total passengers (not including the driver) is 0.10 and the day of the week the maneuver is typically taken are Saturdays and Sundays. The edge 311 shows that continuing straight ahead is performed when the speed range is between 50-65 mile per hour, the total passengers is 0.75 and the day of the week the maneuver is typically taken are Saturdays and Tuesdays. The edge 312 shows that a right hand veer is performed when the speed range is between 25-35 mile per hour, the total passengers is 0.15 and the day of the week the maneuver is typically taken are Saturdays and Tuesdays. A prediction algorithm ranks the possible maneuvers based upon the current context. In this case, the right hand veer edge 303 has contextual information that is similar to the current context and would be ranked as the highest probability, continuing forward edge 302 would be ranked second as it has one piece of matching information, and left hand turn 301 would be ranked third as it has the least matching contextual information.

Networks Implementing Embodiments of the Invention

Figure 4:
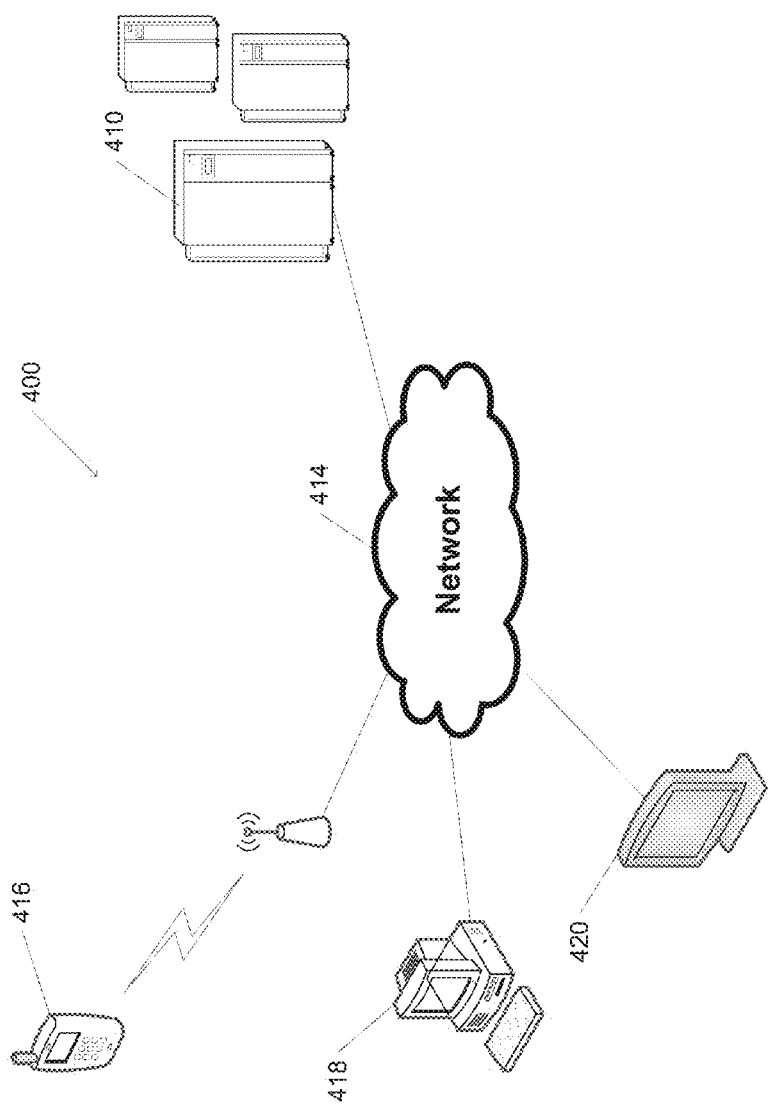
FIG. 4 illustrates a network including a mobile device, service provider system, and a cloud storage system in accordance with embodiments of this invention.

A system that provides inferences for use in a prediction process in accordance with embodiments of this invention is show in FIG. 4. Devices 416, 418, and 420 that collect event information and make predictions of events are connected to network 414. A device 416 is a mobile device that connects to network 414 via a wireless connection. Examples of the device 416 include, but are not limited to mobile telephones, tablets, Personal Digital Assistants (PDA), laptop computers, vehicle infotainment systems and the like. The devices 418 and 420 are devices that connect to the network 414 over a conventional "wired" connection. Examples of the device 418 include, but are not limited to, laptop computers, desktop computers, video game entertainment systems, Digital Video Recorders (DVRs), and the like. Examples of device 420 include, but are not limited to, Smart Televisions. The network 414 is any Wide Area Network (WAN) that connects processing devices for communication purposes including, but not limited to, the Internet.

Cloud storage system 410 is also connected to network 414. The cloud storage system 410 is a set of computer devices that are communicatively connected to store and manage data in a distributive manner. The computer devices of cloud storage system 410 may be connected by any type of network including, but not limited to, a Local Area Network (LAN), a WAN, and/or the Internet.

Figure 5:
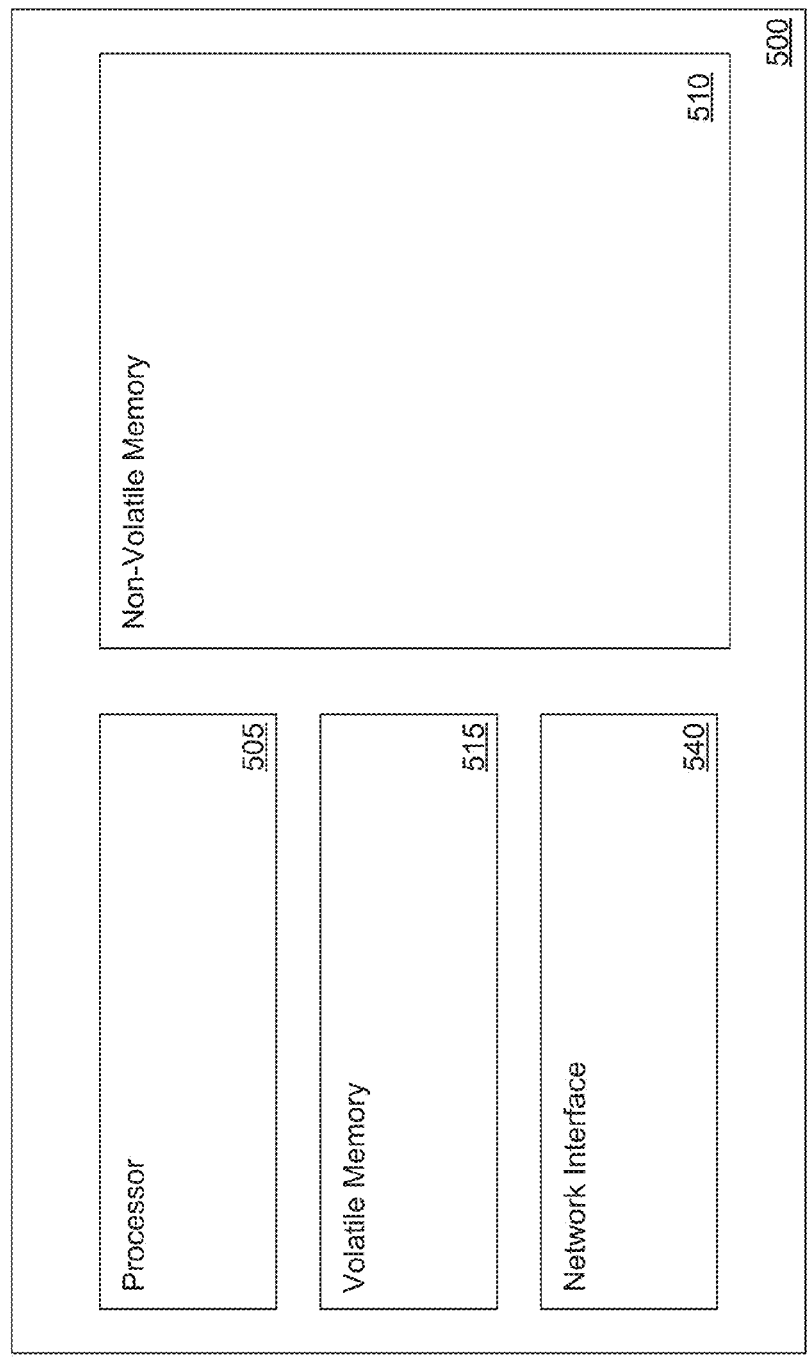
FIG. 5 illustrates a block diagram of components of a processing system in a computing device in accordance with embodiments of this invention.

A block diagram of a processing system in a device such as a device 416, 418 and 420, and cloud storage system 410 that performs one or more processes based upon instructions stored in a memory, or embedded in hardware in accordance with embodiments of this invention is shown in FIG. 5. One skilled in the art will recognize that a processing system may include other components that are omitted for brevity without departing from this invention. The processing device 500 includes a processor 505, a non-volatile memory 510, and a volatile memory 515. The processor 505 is a processor, microprocessor, controller, or a combination of processors, microprocessor, and/or controllers that performs instructions stored in the volatile 515 or non-volatile memory 510 to manipulate data stored in the memory. The non-volatile memory 510 can store the processor instructions utilized to configure the processing system 500 to perform processes including processes in accordance with embodiments of the invention and/or data for the processes being utilized. In other embodiments, the processing system software and/or firmware can be stored in any of a variety of non-transient computer readable media appropriate to a specific application. A network interface is a device that allows processing system 500 to transmit and receive data over network based upon the instructions performed by processor 505. Although a processing system 500 is illustrated in FIG. 5, any of a variety of processing system in the various devices can configured to provide the methods and systems in accordance with embodiments of the invention can be utilized.

Configuration of a User Device

Figure 6:
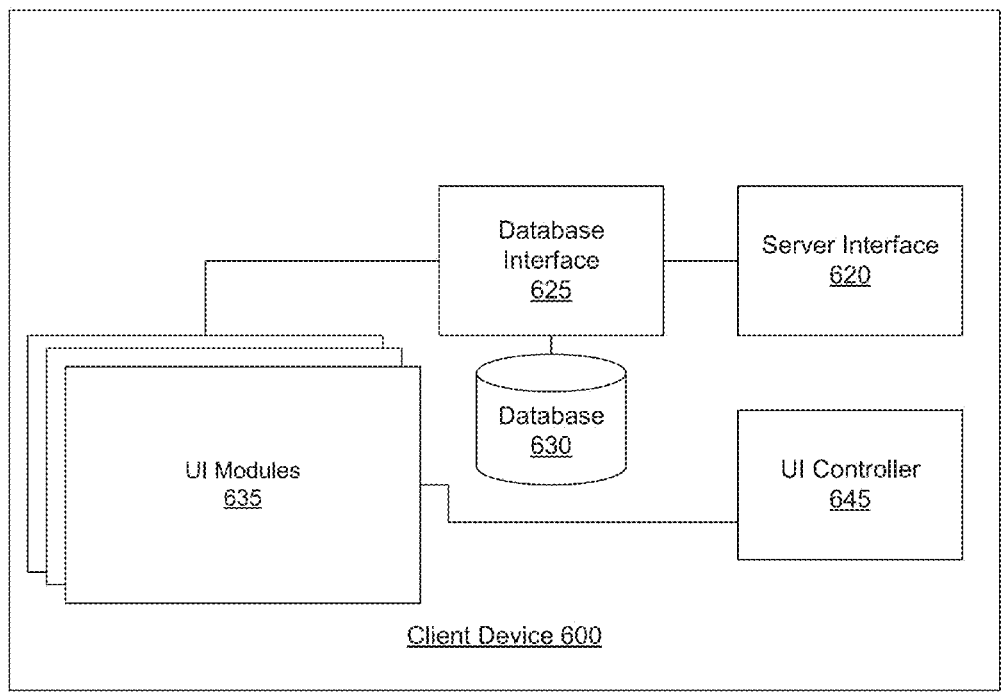
FIG. 6 illustrates a block diagram of software components in a mobile device in accordance with embodiments of this invention.

A block diagram of a set of software processes in a mobile device 418 that collect data and use inferences to make predictions about content to provide to a user in accordance with embodiments of this invention is shown in FIG. 6. A Client device 600 includes a server interface 620, a database 630, a database interface 625, a User Interface (UI) controller 645 and UI modules 635. The server interface 620 includes a process or processes that communicate with a service provider system to transmit and receive data for the UI. Database 630 stores the information needed by the UI to provide a UI on a display for a user. The database stores event information, current contextual information, inferences, and UI module information in accordance with embodiments of this invention. Database interface 625 is the process or processes that interact with the database 630 to store received data and to access stored data for use by the other modules. The UI modules 635 are each software processes that provide a specific aspect of the UI. In accordance with embodiments of this invention, particular aspects of the UI include, but are not limited to, a social media window, a current driving conditions window, a navigation window, and an advertisement window. The UI controller 645 is the process that generates and maintains the UI. In accordance with many embodiments of the invention, the generating and maintaining of the UI may include, but is not limited to, receiving inputs from users, determining the UI modules to include in the UI; recording events detected by the UI; obtaining contextual information; and using inferences and contextual information to make predictions as to the content to present using the UI.

Figure 7:
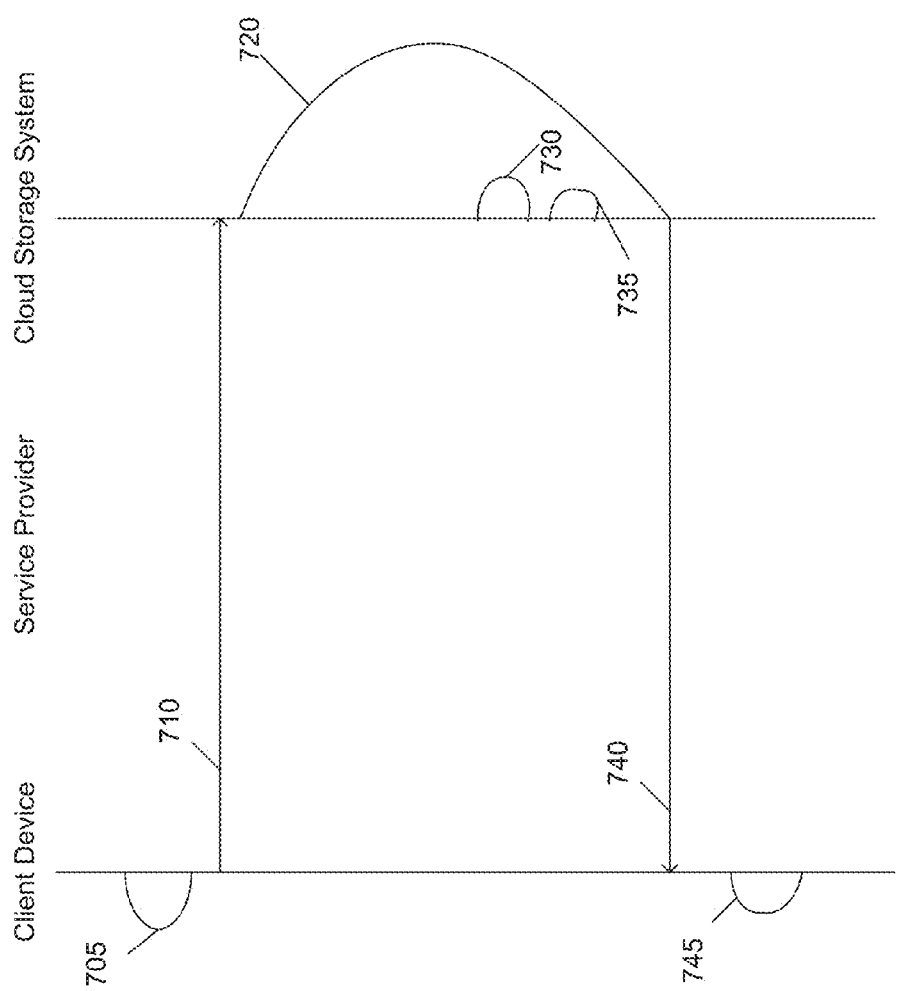
FIG. 7 illustrates a timing diagram of a process for generating inferences and providing the inferences to a mobile device in accordance with embodiments of this invention.

A timing diagram of the process for providing inferences for a prediction algorithm in a client device in accordance with embodiments of this invention is shown in FIG. 7. An event is detected in the client device (705). The client device then obtains contextual information for the event and generates an event record. The client device transmits the generated event record to the cloud storage system (710). The cloud storage system stores the event record on a node in the cloud storage system. Inference generating processes are periodically executed by the cloud storage system to generate inferences from the stored event records and/or other contextual data stored by the cloud storage system (720).

The inferences for a particular device generated by the cloud storage system are provided to the particular device (740). The cloud storage system may then analyze the inferences to generate reports (730) and use the inferences for map data creation (735). The client device then uses the received inferences and the current contextual information available to the device for a prediction algorithm to generate prediction information provided to applications being provided by the device (745). One skilled in the art will recognize that one or more of the functions described above may be performed in a different or by another device without departing from embodiments of the invention.

Figure 8:
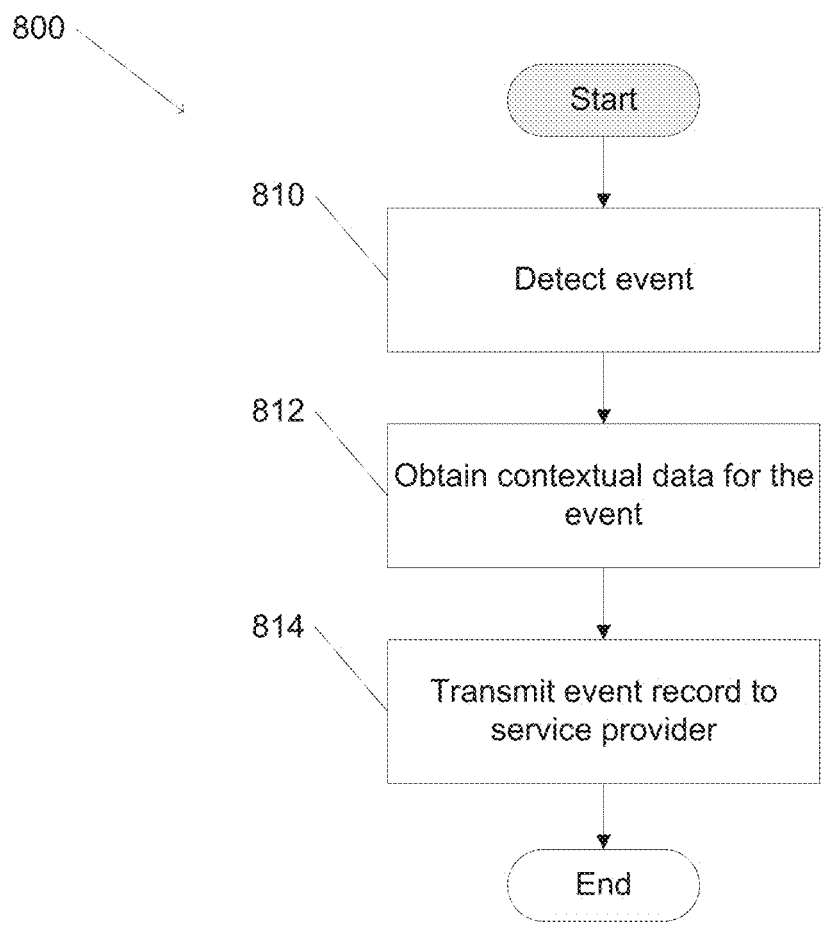
FIG. 8 illustrates a flow diagram of a process performed by a mobile device for capturing event information in accordance with embodiments of this invention.

A process performed by a mobile device to record an event and provide an event record to the cloud storage system in accordance with embodiments of this invention is shown in FIG. 8. The process 800 includes detecting that an event occurs (810), obtaining contextual information for the event (812), and transmitting an event record to the cloud storage system (814). The detecting of an event (810) may be performed by detecting interactions with the device. Interactions may include inputs received from the user, a sensor connected the mobile device or information received from a service provider via a network connection. Examples of user interaction in accordance with embodiments where the device is an infotainment device in a vehicle include, but are not limited to, display window changes on the device, search element selection, and cabin temperature selections. Examples of sensor interactions in accordance with embodiments where the device is an infotainment device in a vehicle include, but are not limited to, detection of an engine start/stop, detection of door conditions (closed/ajar), tire pressure, fuel levels, tire slip distortion, wiper activity, lidar input, camera input, acceleration, breaking, and suspension input, environmental temperature, barometric pressure, ambient light, and cloud cover. Examples of information received via network interaction in accordance with embodiments where the device is an infotainment device in a vehicle include, but are not limited to, Global Position System (GPS) coordinates and time coordinates.

When an event is detected, contextual information is obtained for the event. The contextual information may be obtained from sensors connected to the device, via transmissions over a communication network, or read from a memory. In accordance with embodiments of the invention, contextual information is information relating to the current conditions at the time of the event. Examples of contextual information in embodiments where the device is a navigation device in a vehicle, include, but are not limited to, user of the device, date (including date of the month and/or date of the week), time of day, and sensor data (including number of passengers, and engine conditions). An event summary record including the recorded event and the contextual information obtained is then generated and transmitted to a cloud storage system via a communication (814).

Although a specific process for detecting and reporting events performed by a mobile device is described above with respect to FIG. 8, any of a variety of processes may be utilized in accordance with embodiments of the invention.

Figure 9:
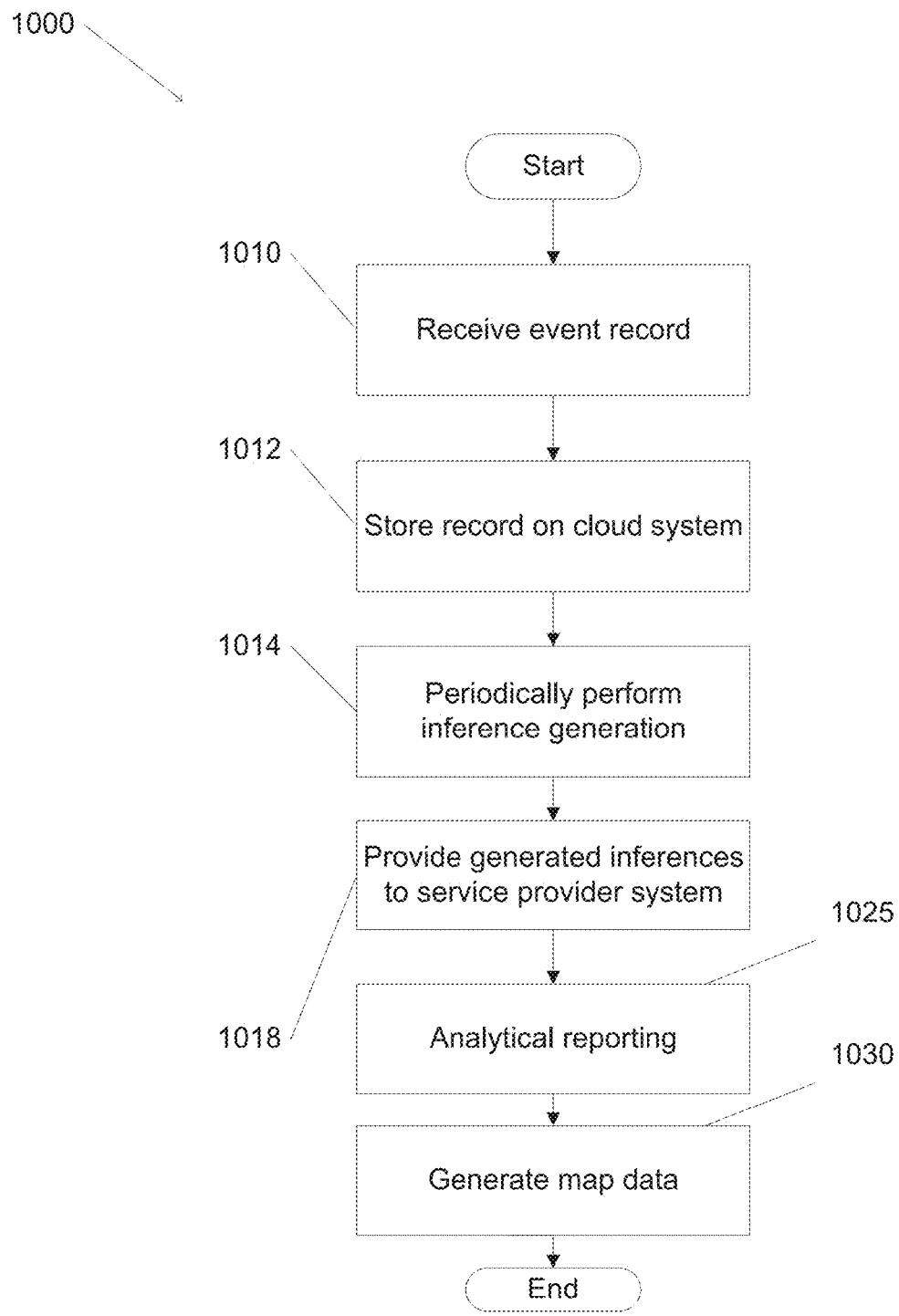
FIG. 9 illustrates a flow diagram of a process for storing event information and providing inferences performed by a cloud storage system in accordance with embodiments of this invention.

A process performed by one or more devices in a cloud storage system in accordance with embodiments of this invention is shown in FIG. 9. Process 1000 includes receiving an event record from a client device (1010), storing the record on the cloud storage system (1012), periodically performing inference generation based on the stored event records (1014) and providing the generated inferences to a provider system (1018). Event records are received via a network connection from the client device (1010). The event records are stored by the cloud storage system in the memory of nodes of the cloud storage system in a distributive manner (1012). Inference generation processes are then performed by one or more devices on the cloud storage system (1014). Each inference generation process generates inferences for a particular type of event, particular user, and/or particular device. The cloud storage system my use the event records and/or secondary contextual data that is stored by the cloud storage system to generate the inferences. Processes for generating an inference are discussed in greater detail below. The inferences generated by the cloud storage system are transmitted to the particular user and/or client device combination (1018). In accordance with some embodiments, the inferences may be provided to the client device based upon polling by the client device that requests the inferences from the cloud storage system. The requests may be done at the time of device start-up and or periodically by a client device. In accordance with a number of embodiments, the inferences are provided periodically by the cloud storage system to provide a current set of inferences to the client device. In accordance with a number of embodiments, the inferences related a particular user are stored by the cloud storage system as part of a user profile in a user profile database and the profile is sent to a device when requested by the device. Furthermore, the stored inferences may be used periodically for analytical reporting (1025) and/or generating map data (1030) by the cloud storage system.

Although a specific process for handling events records and generating inferences performed by a cloud storage system is described above with respect to FIG. 9, any of a variety of processes may be utilized in accordance with embodiments of the invention.

Figure 10:
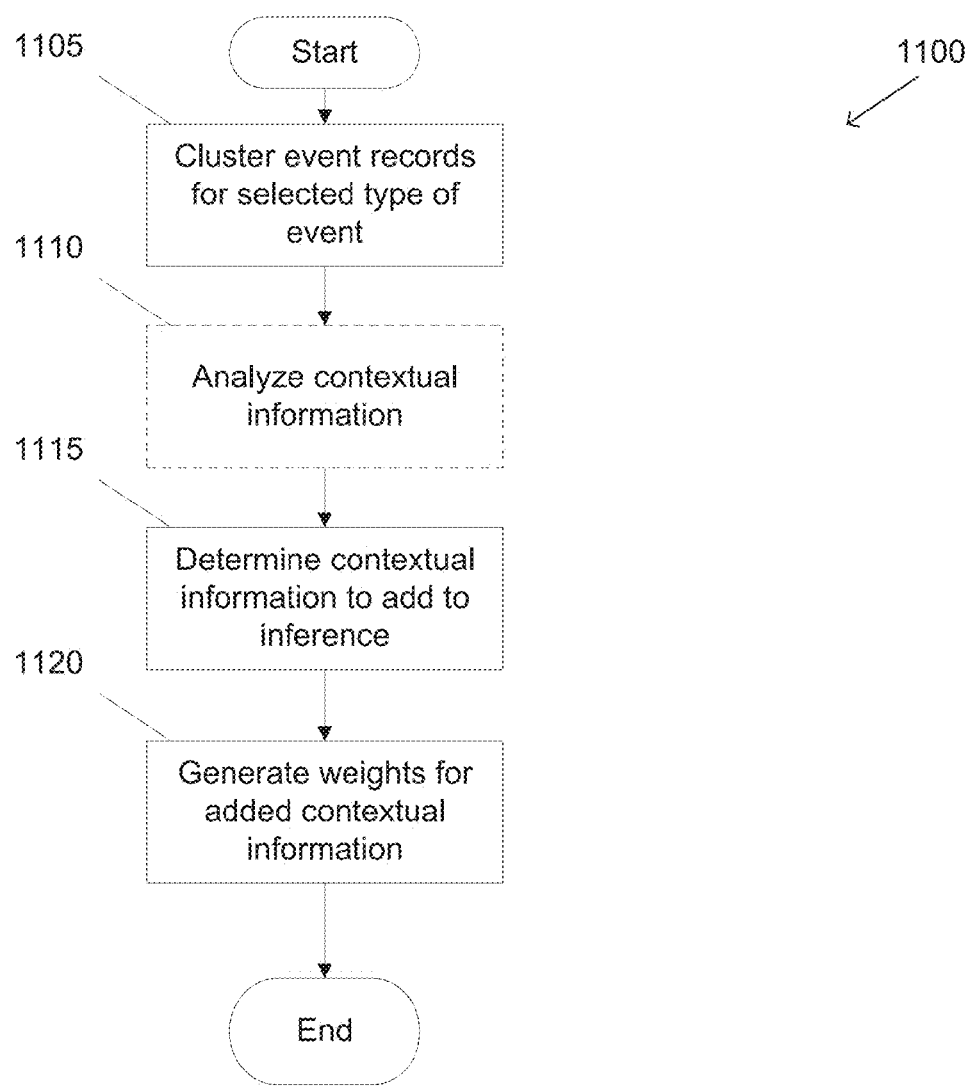
FIG. 10 illustrates a flow diagram of a process for generating inferences performed by a cloud storage system in accordance with embodiments of this invention.

A process for generating an inference for an event performed by the cloud storage system in accordance with embodiments of this invention is shown in FIG. 10. One skilled in the art will recognize that a number of different inference generation modules or processes may be performed in parallel and/or periodically by a cloud storage module to generate inferences for different types of events. For example, one inference module may generate inferences for destinations, another inference generation module may generate inferences for routes, and another module may generate inferences for maneuvers in accordance with embodiments incorporated into infotainment systems in vehicles. Process 1100 includes, cluster events records of similar events, users, and/or devices (1105), analyzing the contextual information in the records (1110), determining pieces of contextual information associated with the event (1115), and generating weights for each piece of contextual information associated with an event (1120). A clustering algorithm is passed over the event records to group similar events that refer to one type of event. For example, a vehicle may be parked in different areas for the same destination and events recording the stopping of the car while different refer to the same type of event. The aggressiveness of the clustering depends on the density of the measured events.

The event records are also clustered based upon the user and/or vehicle. Each cluster of event records is analyzed to determine the pieces of contextual information for each recorded event (1110). Based upon the analysis, the pieces of contextual information that are closely associated with an event are selected for inclusion into the list of contextual information for the inference for a particular event (1115). The analysis is also used to assign weights to each piece of contextual information (1120). The weight of each piece of contextual information indicates the strength of the association between the piece of the contextual information and the event.

Although a specific process for generating inferences performed by a cloud storage system is described above with respect to FIG. 10, any of a variety of processes may be utilized in accordance with embodiments of the invention.

Figure 11:
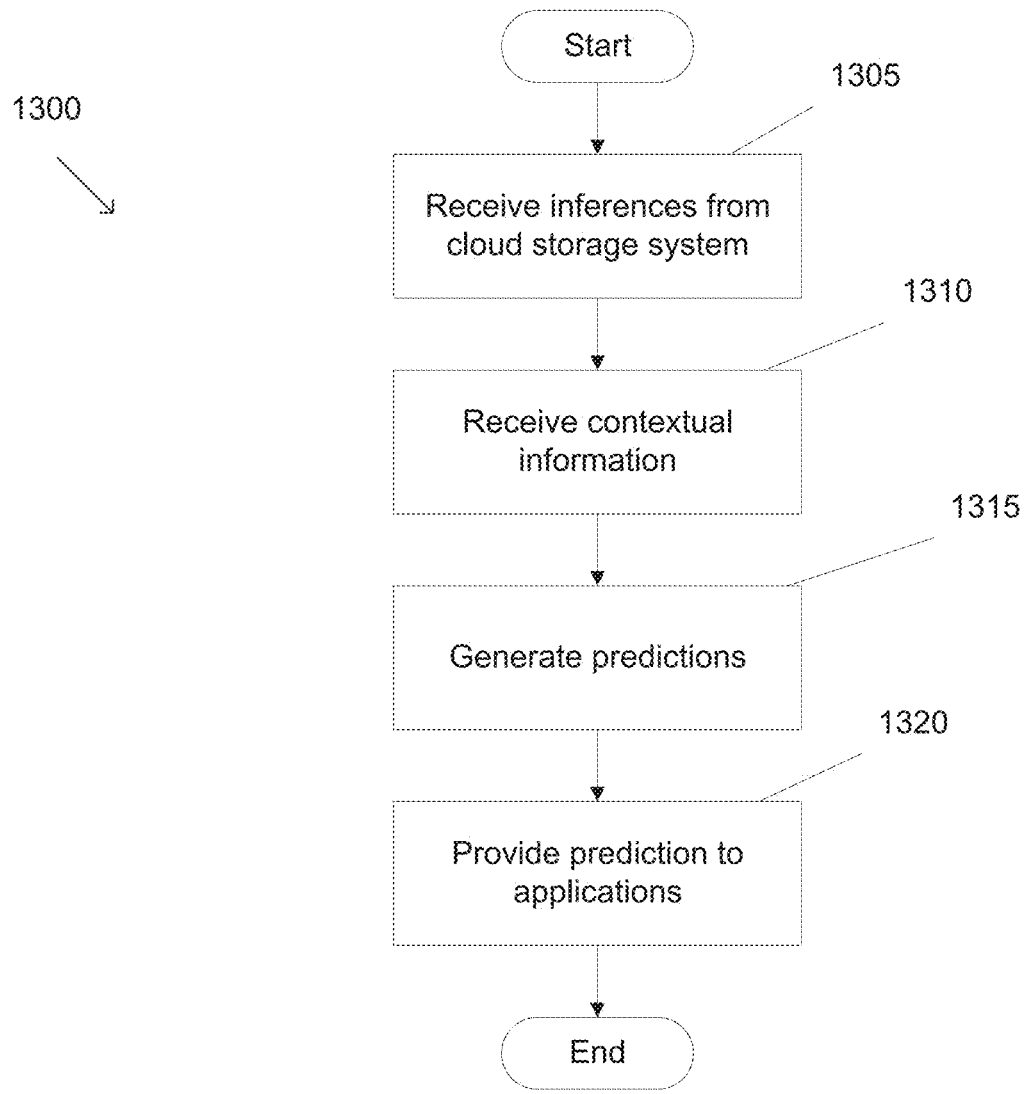
FIG. 11 illustrates a flow diagram of a process performed by a mobile device for using inferences to predict an event and obtain desired information in accordance with embodiments of this invention.

A process performed by mobile device using the inferences received from a cloud storage system in accordance with embodiments is shown in FIG. 11. In process 1300, the device receives inferences from the cloud storage system (1305), updates the current contextual information (1310), generates predictions based on the inferences and current contextual information (1315), and various applications may use updates the UI based upon the predicted events to control processes in accordance with the expected use of the device for the predicted event (1320). The inferences are received from the cloud storage system via the network and stored in the database (1305). In accordance with some embodiments, only a current set of inferences is stored. In accordance with some other embodiments, each inference is stored and used for a predetermined period. In accordance with still other embodiments, only a currently updated inference for each event is stored.

The current contextual information is obtained (1310). The contextual information may be obtained be requesting and/or receiving information from sensors, receiving contextual information from one or more providers via a communications network and/or read from a memory. The inferences are provided to a prediction algorithm that generates a probability equation for each event using the contextual information in the inference and the weights of each inference. The current contextual information is then applied to the probability equation to generate prediction information (1315). In accordance with some embodiments, the prediction information includes the probability of a particular event occurring. In accordance with a number of embodiments, the prediction information includes the probabilities of for each of a number or possible events of a given type occurring and the events may be ranked in accordance with the probabilities for the events. The device provides the prediction information to applications being performed by the device for use in the applications to perform the application tasks (1320). For example, the UI controller of the device may use the prediction information to provide information related to the predicted event on the UI in accordance with an embodiment of the invention.

Although a specific process that uses inferences performed by a mobile device is described above with respect to FIG. 11, any of a variety of processes may be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A mobile device comprising:
   memory; and
   a processor directed by instructions stored in the memory to:
   detect an event in the device wherein an event is an interaction with the device,
   obtain contextual information for the event wherein contextual information is based on current information available to the device and indicates an environment of the device at a time of the event,
   generate an event record that includes an identifier of the event and the contextual information,
   transmit the event record to a service provider system,
   receive an inference from the service provider system wherein the inference is generated from event records for the device stored in a cloud storage system by the service provider wherein the inference includes a plurality of alternative events and contextual variables for each of the plurality of alternative events,
   obtain current contextual information for the device wherein the current contextual information describes the current environment of the device, apply the inference and the current contextual information for the device to a prediction engine to generate prediction information wherein the prediction information includes a possible event and an indication of a probability that the possible event will occur, and provide the prediction information to an application performed by the device wherein the application uses the prediction information to configure the application to operate in accordance with the prediction information based on the possibility that the possible event will occur.

2. The system of claim 1, wherein the contextual information further comprises metadata describing the identity of the user of the device.

3. The system of claim 1, wherein the contextual information further comprises sensor data selected from the group consisting of number of passengers and engine conditions.

4. The system of claim 3, wherein the sensor data is obtained using at least one sensor connected to the device.

5. The system of claim 1, wherein the contextual information is received from a provider system.

6. The system of claim 1, wherein the contextual variables for each of the plurality of alternative events is selected from the group consisting of weather conditions, road conditions, traffic conditions, and points of interest on road networks.

7. The system of claim 1, wherein the processor is further directed to display a user interface comprising a representation generated based on the provided prediction information.

8. The system of claim 7, wherein the generated representation comprises rank information for the provided prediction information.

9. The system of claim 8, wherein the provided prediction information is displayed based on the rank information.

10. The system of claim 1, wherein the mobile device is integrated into the infotainment system of a vehicle.

11. The system of claim 1, wherein the event records comprise a trip event representing movement across space from an origin to a destination.

12. The system of claim 1, wherein the event records comprise a stop event representing an individual leaving a vehicle.

13. The system of claim 12, wherein the stop event further comprises a count of the number of passengers in the vehicle.

14. The system of claim 1, wherein the event records further comprise a timestamp indicating the time at which the event occurred.

15. The system of claim 14, wherein the processor is further directed to build a model of relations between places based on the event records and the timestamps.

* * * * *